United States Patent
Das et al.

(10) Patent No.: US 9,031,970 B1
(45) Date of Patent: May 12, 2015

(54) QUERY AUTOCOMPLETIONS

(75) Inventors: Abhinandan S. Das, Sunnyvale, CA (US); Bartlomiej Niechwiej, Fremont, CA (US); Jonathan J. Effrat, Mountain View, CA (US); Marcin K. Wichary, San Francisco, CA (US)

(73) Assignee: Google Inc., Mountain View, CA (US)

( * ) Notice: Subject to any disclaimer, the term of this patent is extended or adjusted under 35 U.S.C. 154(b) by 194 days.

(21) Appl. No.: 13/186,930

(22) Filed: Jul. 20, 2011

Related U.S. Application Data (60) Provisional application No. 61/436,595, filed on Jan. 26, 2011.

(51) Int. Cl.
  *G06F 7/00* (2006.01)
  *G06F 17/30* (2006.01)
  *G06F 17/27* (2006.01)

(52) U.S. Cl.
  CPC .......... *G06F 17/3064* (2013.01); *G06F 17/276* (2013.01)

(58) Field of Classification Search
  CPC .. G06F 17/3063; G06F 17/276; G06F 17/273
  USPC ............. 707/706, 767, 76, 856; 715/257, 259
  See application file for complete search history.

(56) References Cited

U.S. PATENT DOCUMENTS

| | | | |
|---|---|---|---|
| 6,564,213 B1 * | 5/2003 | Ortega et al. ........................ 1/1 |
| 6,760,746 B1 * | 7/2004 | Schneider ..................... 709/203 |
| 7,836,044 B2 | 11/2010 | Kamvar et al. |
| 8,234,293 B2 * | 7/2012 | Martynov et al. ............. 707/767 |
| 8,417,718 B1 * | 4/2013 | Finkelstein et al. .......... 707/767 |
| 8,437,778 B1 * | 5/2013 | Ortega et al. ............... 455/456.2 |
| 8,577,913 B1 * | 11/2013 | Hansson et al. .............. 707/767 |
| 8,645,825 B1 * | 2/2014 | Cornea et al. ................. 715/257 |
| 2008/0059607 A1 * | 3/2008 | Schneider ..................... 709/218 |
| 2008/0065617 A1 * | 3/2008 | Burke et al. ....................... 707/5 |
| 2008/0109401 A1 | 5/2008 | Sareen et al. |

(Continued)

OTHER PUBLICATIONS

Chennavasin, Don "A look inside the world of search from the people of Yahoo!" http://www.ysearchblog.com/archives/000301.html. Yahoo! Search blog: Livesearch on AlltheWeb. May 9, 2006, 5 pages.
YouTube.com "Livesearch: Predictive Search Engine from Yahoo (2006)" http://www.youtube.com/watch?v=_EaSocSYSB8. [online] [retrieved Aug. 19, 2011].

(Continued)

*Primary Examiner* — Cheyne D Ly
(74) *Attorney, Agent, or Firm* — Fish & Richardson P.C.

(57) ABSTRACT

Methods, systems, and apparatus, including computer programs encoded on a computer storage medium, for obtaining query completions. In one aspect, a method includes receiving a query input in a search engine query input field in a user interface. The method also includes submitting the query input as a first query stem to an autocompletion module. The method also includes receiving a first response from the autocompletion module, the first response providing no first query autocompletions. The method also includes submitting a second query stem to the autocompletion module, the second query stem being the first query stem with a first prefix removed. The method also includes receiving a second response from the autocompletion module including one or more second autocompletions satisfying a second quality test. The method also includes providing second autocompletions for presentation on the user interface.

10 Claims, 4 Drawing Sheets

(56) References Cited

U.S. PATENT DOCUMENTS

2009/0043741 A1    2/2009  Kim
2009/0094211 A1    4/2009  Marvit et al.
2009/0106224 A1*   4/2009  Roulland et al. .................. 707/5
2009/0119289 A1    5/2009  Gibbs et al.
2010/0306228 A1   12/2010  Carpenter et al.
2012/0166929 A1*   6/2012  Henderson et al. ........... 715/224

OTHER PUBLICATIONS

McGee, Matt "Yahoo Had Instant Search in 2005 & Dropped It; Bing Kind of Has It Now," http://www.searchengineland.com. Sep. 9, 2010, 12 pages.

"The Real Live Search" http://www.istartedsomething.com/livesearch. [online] [retrieved on Aug. 5, 2011] 1 page.

* cited by examiner

QUERY AUTOCOMPLETIONS

CROSS-REFERENCE TO RELATED APPLICATIONS

This application claims priority to U.S. Provisional Application Ser. No. 61/436,595, filed on Jan. 26, 2011, entitled "Query Autocompletions," the entire contents of which are hereby incorporated by reference.

BACKGROUND

This specification relates to providing information relevant to user search queries.

Internet search engines identify Internet-accessible resources, e.g., Web pages, images, text documents, and multimedia content, in response to queries submitted by users and present information about the resources in a manner that is intended to be useful to the users.

A search engine allows a user to provide a query input for which search results are returned in response. Some search engines can provide query autocompletions to the user based upon the query input the user entered.

SUMMARY

The specification describes technologies relating to presenting query autocompletions.

In general, one innovative aspect of the subject matter described in this specification can be embodied in methods that include the actions of receiving a query input in a search engine query input field in a user interface, before receiving an input expressly submitting the query input as a query to a search engine, the query input comprising multiple query terms. Actions also include submitting the query input as a first query stem to an autocompletion module to obtain first query autocompletions. Actions also include receiving a first response from the autocompletion module, the first response either providing no first query autocompletions or providing first query autocompletions that do not satisfy a first quality test. Actions also include submitting a second query stem to the autocompletion module to obtain second query autocompletions, the second query stem being the first query stem with a first prefix removed, the first prefix comprising one or more terms, the second query stem comprising one or more terms. Actions also include receiving a second response from the autocompletion module, the second response including one or more second query autocompletions satisfying a second quality test. Actions also include providing one or more second autocompletions satisfying the second quality test for presentation on the user interface.

These and other embodiments may optionally include one or more of the following features. The second quality test may include verifying the autocompletions for quality using the query input. Verifying the autocompletions may include analyzing the autocompletion using a language model. The language model may be derived from user queries. The second quality test may include determining a ratio of a number of times a potential query completion occurs in the user queries to a number of times any query that includes the second query stem occurs in the user queries and comparing the ratio to a threshold value. The second quality test may include applying a smoothing factor to the ratio. The second quality test comprises determining a ratio of a number of times any query that includes the potential query completion as a prefix occurs in the user queries to a number of times any query that includes the second query stem occurs in the user queries and compar-ing the ratio to a threshold value. The actions may include determining the second prefix include assigning a first query term to the second prefix; determining the first query term is part of the compound word; and assigning a second part of the compound word to the second prefix.

Particular embodiments of the subject matter described in this specification can be implemented so as to realize one or more of the following advantages. Query autocompletions can be presented for a wide range of queries. Prefetching search results can occur before the user finishes entering a query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes search engine systems that can present query autocompletions for partially entered queries in scenarios where a particular partial query does not produce any, or very few, query autocompletions. In such scenarios, the search engine system can modify the query by removing, in effect, one or more initial query terms (i.e., removing a prefix of the partially entered query) and determine if the shortened query produces any query autocompletions. The process can be repeated until either a maximum number of repetitions occur, or the shortened query has fewer than a minimum number of query terms. In some implementations, all possible shortened queries are used to determine query autocompletions.

Figure 1:
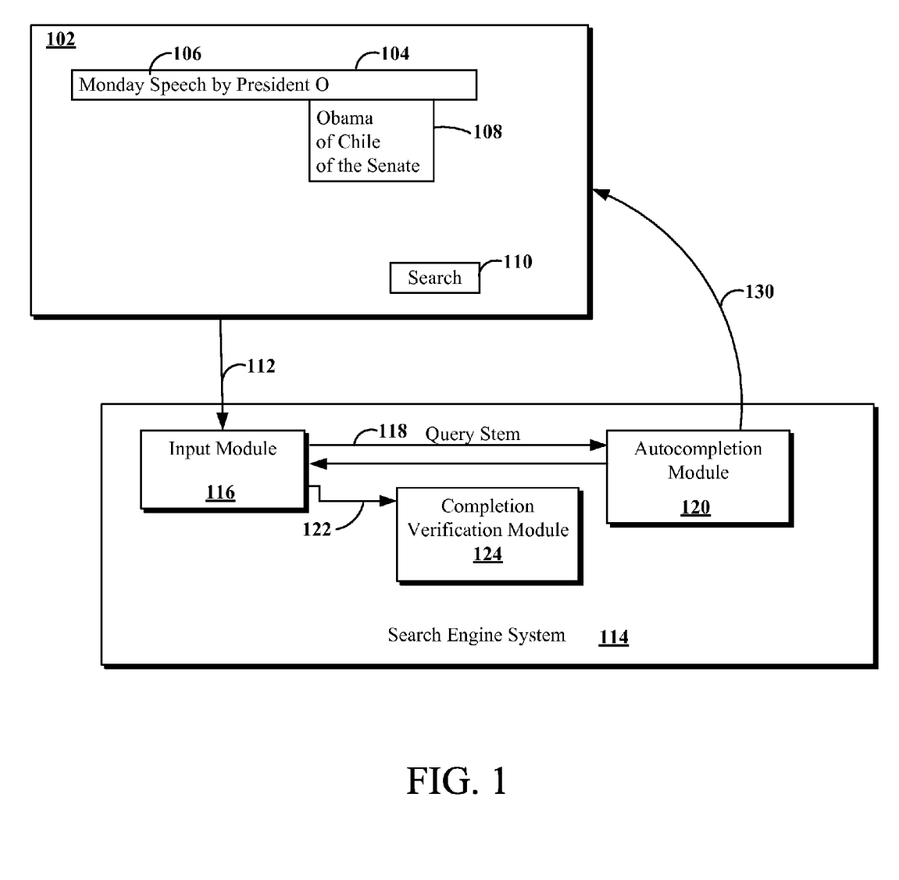
FIG. 1 illustrates an example query completion system.

FIG. 1 illustrates an example query autocompletion system. This system provides a user interface 102 for display on a client device for use by a user. The user interface contains a text input field 104 for receiving a search query input from a user. The user interface contains an input element, e.g., a graphical button 110, which the user can use to submit expressly a completed search request to a search engine system 114. The user interface could also submit a request expressly by typing a particular key, e.g., an "enter" key, or by saying a particular command in a speech interface. Before the user expressly submits a search request, the user interface provides to the search engine a partial query input. In some implementations, the user interface provides each character as it is typed or otherwise entered by the user. In other implementations, the user interface provides multiple characters at a time in response to a pause between character entries (for example, a half a second). The user interface sends a partial query 106 entered in the text input field to the search engine system before the query is expressly submitted by the user. The user interface may be implemented as, for example, a web page running in a web browser, a toolbar running in a web browser, or an independent search client running on the client device.

The search engine system includes an input module 116 which receives the partial query from the user interface. The search engine system 114 also includes an autocompletion module 120. The input module 116 provides the partial query to the autocompletion module as a query stem 118. The autocompletion module 120 produces a list of query autocompletions for the query stem.

In some implementations, the autocompletion module 120 returns only autocompletions that satisfy a quality condition implemented by the module, and so may not provide query autocompletions for every query stem. In other implementations, the autocompletion module 120 provides quality signals with each query autocompletion and leaves it to the recipient of the autocompletions to determine which are of sufficient quality. Thus, the input engine 116 may ignore query autocompletions based on the quality signal, which has the same effect as the autocompletion module 120 not providing any autocompletions.

In cases where the autocompletion module 120 does not provide query autocompletions for a query stem, the input module 116 can generate a shortened query stem from the query stem. The input module 116 can create a shortened query by taking a suffix of the original partial query or by removing a prefix from the original partial query. The shortened query is submitted to the autocompletion module 120 to determine if any query autocompletions are available for the shortened query. In some implementations, the input module 116 can create a shortened query by removing stop words or obscure terms from the original partial query.

The input module 116 provides (122) the query autocompletions to a completion verification module 124. The completion verification module determines a measure of quality of the query autocompletion in the context of the partial query. In some implementations, the completion verification module uses a conventional language model for the language of the query to determine a quality score associated with the query autocompletion.

In general, the language model assigns a probability to a sequence of words (e.g., a probability that "President" and "Obama" occur together). In some implementations, the language model can be a unigram model in which the probability of each term is considered independent of other terms. In other implementations, the language model can be an n-gram model in which the probability of terms occurring together is determined. Other language models can also be used.

Probabilities in language models are determined based on a corpus. The corpus can be, for example, documents in a document repository or queries stored in a query log. In some implementations, the corpus can be a query log of queries submitted over a given period of time (for example, one month, six months, or one year).

From the language model the completion verification module 124 calculates a probability that new terms in the query autocompletion occur in conjunction with words that are in the original partial query but are not in the shortened query stem. For example, the user interface 102 sends the partial query "Monday Speech by President O", the input module 116 creates a shortened query stem "President O" by removing the query terms "Monday Speech by". The autocompletion module 120 suggests the completion "President Obama." The completion verification module 124 may use the language model to determine a probability for the term sequence "Monday", "Speech", "by", "Obama". In some implementations, the completion verification module 124 ignores stop words (a word generally ignored by linguistic processing, for example, the, a, as, at, by, for, or of). In some implementations, the completion verification module 124 determines if the calculated probability exceeds a threshold value, for example 0.5. Query autocompletions that have calculated probabilities that exceed the threshold value are considered good query autocompletions. Query autocompletions that have calculated probabilities that are less than the threshold are ignored.

In other implementations, the completion verification module 124 compares the query autocompletion and the partial query to a set of prior queries submitted by other users over a period of time (for example, one day, one month, six months) to determine a frequency of occurrence of the query autocompletion and the partial query, as discussed below with reference to FIG. 3. The prior queries can be stored anonymously, so that the identity of the users who submitted the prior queries cannot be determined. In other implementations, the query completion module compares the query autocompletion and the query stem to the set of prior queries to determine a frequency of occurrence of the query autocompletion and the query stem.

The completion verification module 124 can also verify an autocompletion using the language model. The language model can be created from a corpus of general documents, for example HTML pages on the World Wide Web, or from a specialized corpus, for example, a set of queries submitted to a search engine.

Figure 2:
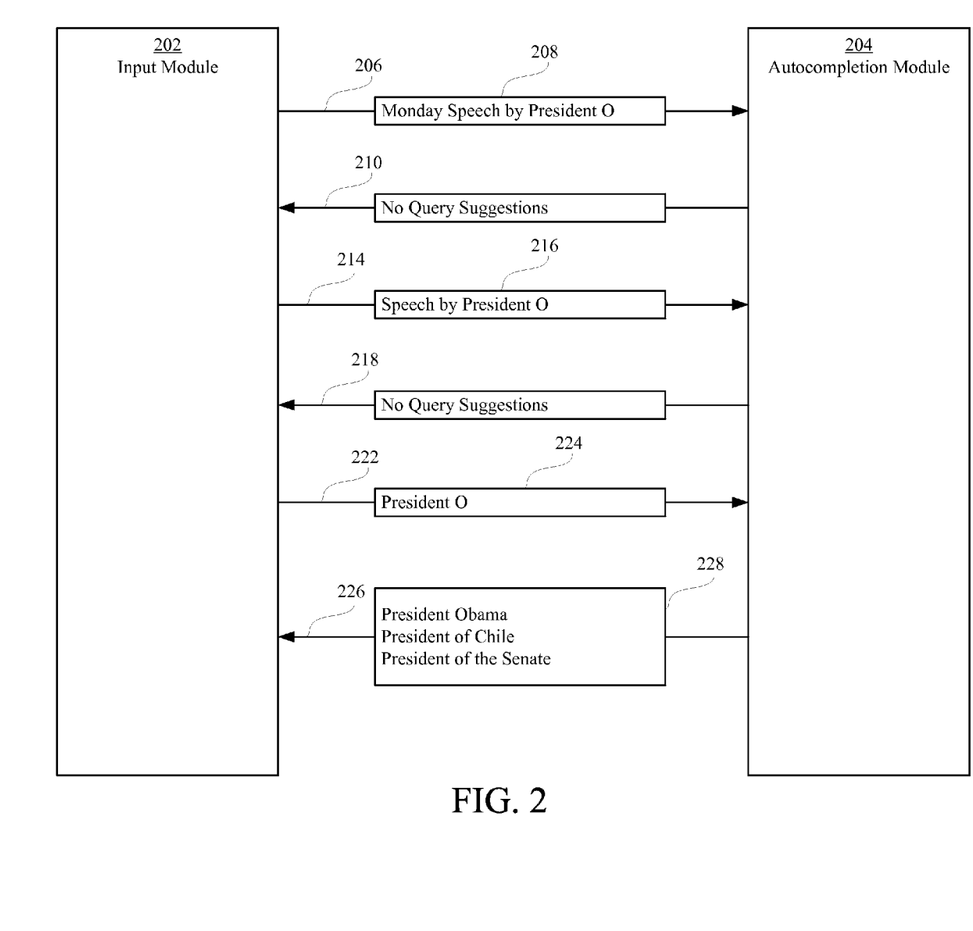
FIG. 2 illustrates example interactions between an input module and an autocompletion module.

FIG. 2 illustrates interactions between an input module and an autocompletion module in an example scenario. An input module 202 (for example, the input module 116 of FIG. 1) receives a query stem "Monday Speech by President O." The input module 202 sends (206) the query stem 208 "Monday Speech by President O" to an autocompletion module 204 (for example, the autocompletion module 120 of FIG. 1).

The autocompletion module 204 determines that no query autocompletions are available for the query stem 208. The autocompletion module 204 sends (210) the input module 202 a response that indicates that no query autocompletions are available. The input module 202 removes the first query term from the query stem. The input module 202 sends (214) the shortened query stem 216 to the autocompletion module 204.

In this example, the autocompletion module 204 determines that no query autocompletions are available for the shortened query stem 216. The autocompletion module 204 sends (218) the input module 202 a response indicating that no autocompletions are available.

The input module 202 removes the first query term from the shortened query stem 216. In some implementations, under certain conditions the input module 202 removes multiple query terms from a query stem. For example, if a query stem begins with a compound word (e.g. twenty-one) the input module 202 removes both parts of the compound word together. Similarly, if the query stem begins with words recognized as being a compound term (e.g., "New York" or "Lord of the Rings") the entire compound term may be removed. If the resulting shortened query stem begins with a stop word the input module 202 can remove the stop word from the shortened query stem. In some implementations, the input module 202 also removes prepositions and other parts of speech that do not typically start a sentence. In this example, the input module 202 determines that the shortened query stem would begin with the stop word "by" and removes a second query term from the shortened query stem. In some implementations, the input module 202 also removes specific characters based on a black list (e.g., "+", "&", etc.).

The input module provides (222) the shorted query stem 224 "President O" to the autocompletion module 204. The autocompletion module 204 identifies three query autocompletions 228 that begin with the phrase "President O." The autocompletion module 204 returns (226) the query autocompletions 228 to the input module 202.

In some implementations, the number of times the input module 202 wills send a further shortened query to the autocompletion module can be described by the formula:

$$N = \max(0, \min(M - cmw, cmr))$$

where N is the maximum number of times the input module will send the shortened query stem, M is the number of query terms in the query, cmw is the minimum number of query terms in a shortened query stem (for example, 1, 2, 3, 4, or 5), and cmr is the maximum number of retries (for example, 4, 6, 8, or 10). In some implementations M is determined by ignoring stop words, counting compound words as a single query term, and counting well known phrases as a single query term.

In some implementations, once the input module 202 determines that the original query stem 208 does not return any query autocompletions, all possible shortened query terms (in this example query term 216 and query term 224) are sent to the autocompletion module 204 in parallel. The query completions for each of the shortened query terms are collected and the highest quality query competitions are presented to the user. Query autocompletions obtained in response to longer query stems can be preferred over query autocompletions obtained in response to shorter query stems, for example, by applying a weight to associated quality scores.

In some implementations, each modified/shortened query stem can be formed by taking suffixes of various query term lengths from the original partial query. For example, given an original query stem of "Monday Speech by President O" the query stems may be "President O" and "Speech by President O". This implementation varies from the above described implementation when N is such that not all query stems will be sent to an autocompletion module.

Figure 3:
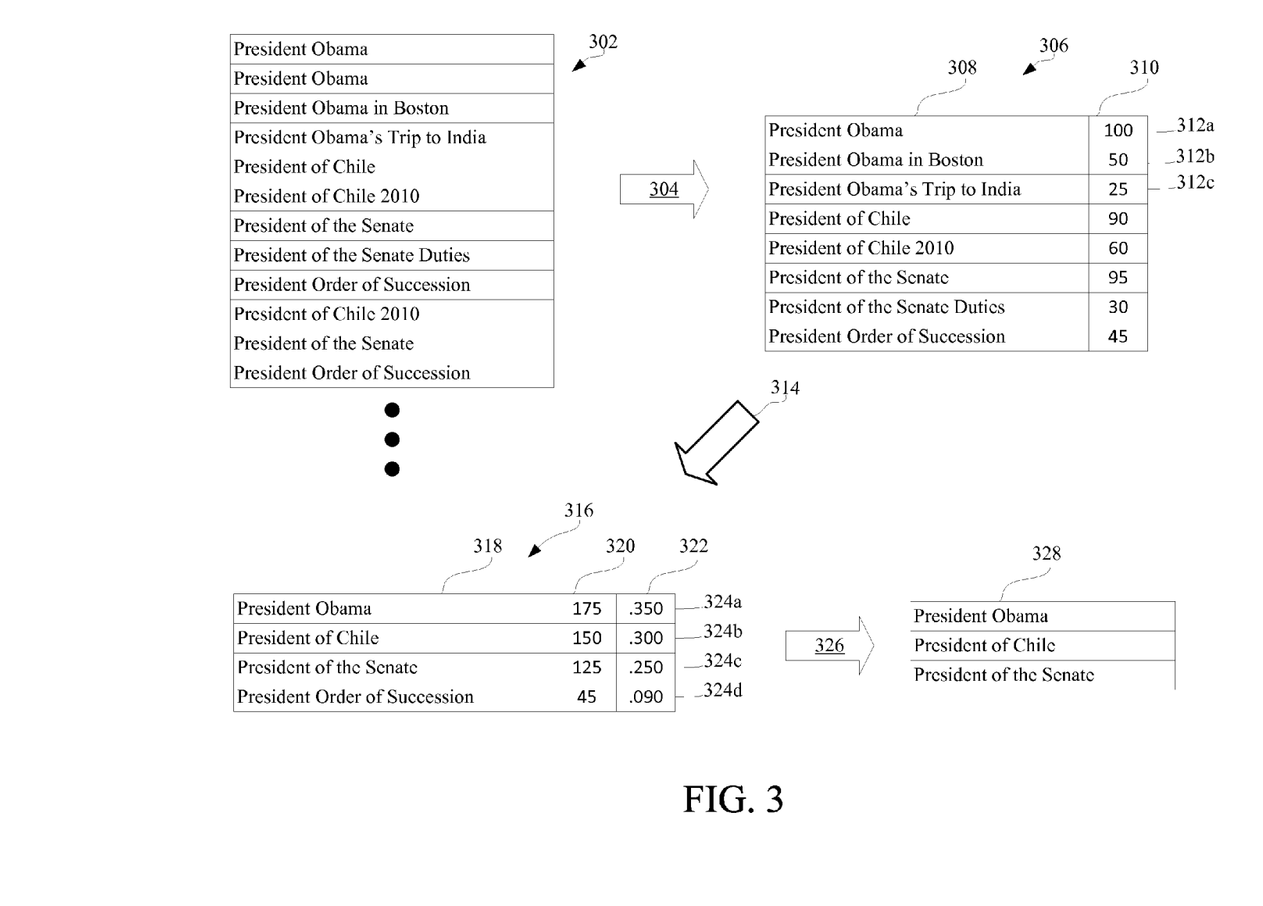
FIG. 3 illustrates a measure of quality of the query completion in the context of the partial query.

FIG. 3 illustrates a measure of quality of the query completion in the context of the partial query. A query log contains a list of queries submitted by users in prior query sessions. The queries may be stored anonymously, without the ability to identify the particular user who submitted the query. The query log can be processed to identify distinct queries and the number of times the query was submitted. The portion of the query log includes, among other queries, queries submitted by other users which include the query stem "President O".

The portion of a processed query log is represented as a table 302 that includes an entry for each query submitted to a search engine. In general, the query log includes the queries submitted by users over a period of time, for example, the last two hours, one week, one month, six months, or one year.

A completion verification module can summarize (304) the query log, in this example, the summarization is presented as a table 306. In this example, the query "President Obama" 312a was submitted 100 times. The query "President Obama in Boston" 312b was submitted 50 times. The query "President Obama's Trip to India" 312c was submitted 25 times.

The completion verification module calculates (314) a quality metric for each potential query completion for a query stem. In some implementations the quality metric can be calculated as the sum of the counts of all queries in the query log which begin with the query completion divided by the sum of the counts of all queries in the query log that begin with the query stem. For example, the quality metric can be calculated according to the formula:

$$\text{quality(completion)} = \frac{\Sigma \text{count(completion)}}{\Sigma \text{count}(querystem) + s}$$

where quality(completion) is a quality score for the autocompletion for which the popularity is being calculated, each completion is a previously submitted query that has the completion as a prefix, count(completion) is a count of the number of time the completion was submitted in the query log, each querystem is a previously submitted query that has the query stem as a prefix, count (querystem) is a count of the number of times the querystem was submitted in the query log, and s is a smoothing constant (for example 5, 10, or 20) which lowers the quality of infrequently submitted queries.

Other metrics can also be calculated. In some implementations a quality metric can be calculated according to the formula:

$$\text{quality(completion)} = \frac{\text{count(completion)}}{\Sigma \text{count}(querystem) + s}$$

where quality(completion) is a quality score for the autocompletion for which the popularity is being calculated, completion is the completion for which the quality metric is being calculated, count(completion) is count of the number of times the completion was previously submitted query, each querystem is a previously submitted query that has the query stem as a prefix, count (querystem) is a count of the number of times the querystem was submitted in the query log, and s is a smoothing constant which lowers the quality of infrequently submitted queries (for example 5, 10, 20).

Table 316 illustrates potential query completions 318, aggregated counts 320 for the query completions, and a quality metric 322 for each query completion. For example, for the query stem "President O", row 324a includes the query completion "President Obama", the count is 175 (the sum of the counts for the queries "President Obama", "President Obama's in Boston", and "President Obama's Trip to India"), and a quality metric of 0.350 (175/500) (assuming a smoothing constant of "5"). Similarly, row 324b includes the query completion "President of Chile", an aggregate count of 150, and a quality metric of 0.300 (150/500). Row 324c includes the query "President of the Senate", an aggregate count of 125, and a quality metric of 0.250 (125/500). Row 324d includes the query "President Order of Succession" with an aggregate count of 45 and a quality metric of 0.090 (45/500).

In some implementations, the input module filters the set of completions based on the quality score. For example, potential query completions with quality scores below a threshold may be omitted. The threshold can be, for example, 0.10, 0.25, or 0.30. In this example, the query completion module selects (326) the potential query completions 318 "President Obama", "President of Chile" and "President of the Senate" as query autocompletions. The input module can also filter out query autocompletions where the autocompletion is a misspelled word.

In some implementations, the query completion module filters the set of completions based on the aggregate count of the number of times the query completion appears in the query log. For example, the query completion module may eliminate a query completion with an aggregate count of less a threshold number (for example, 10).

In some implementations, the set of completions can be further narrowed. A query completion can be divided into two parts, a query stem (the terms initially submitted to the query completion module) and a completion suffix (terms added to the query stem to create the query completion). For example, for the query stem "President O" and the query completion "President of the Senate", the completion suffix is "the Senate", the term "of" which is expanded from the query stem "O" is not included in the query suffix. The query completion module may filter query completions where the number of query terms in the completion suffix exceeds the number of query terms in the query stem. For example, the query completion module would filter out the query completion "President Obama moves into the White House following the inauguration" for the query stem "President O".

In some implementations, the quality of a query autocompletion can include a measure of the popularity of the query and the quality of the results the query produces. For example, a query for which the top results are frequently selected may be determined to have high quality; similarly, a query for which no results are typically selected would have low quality.

Figure 4:
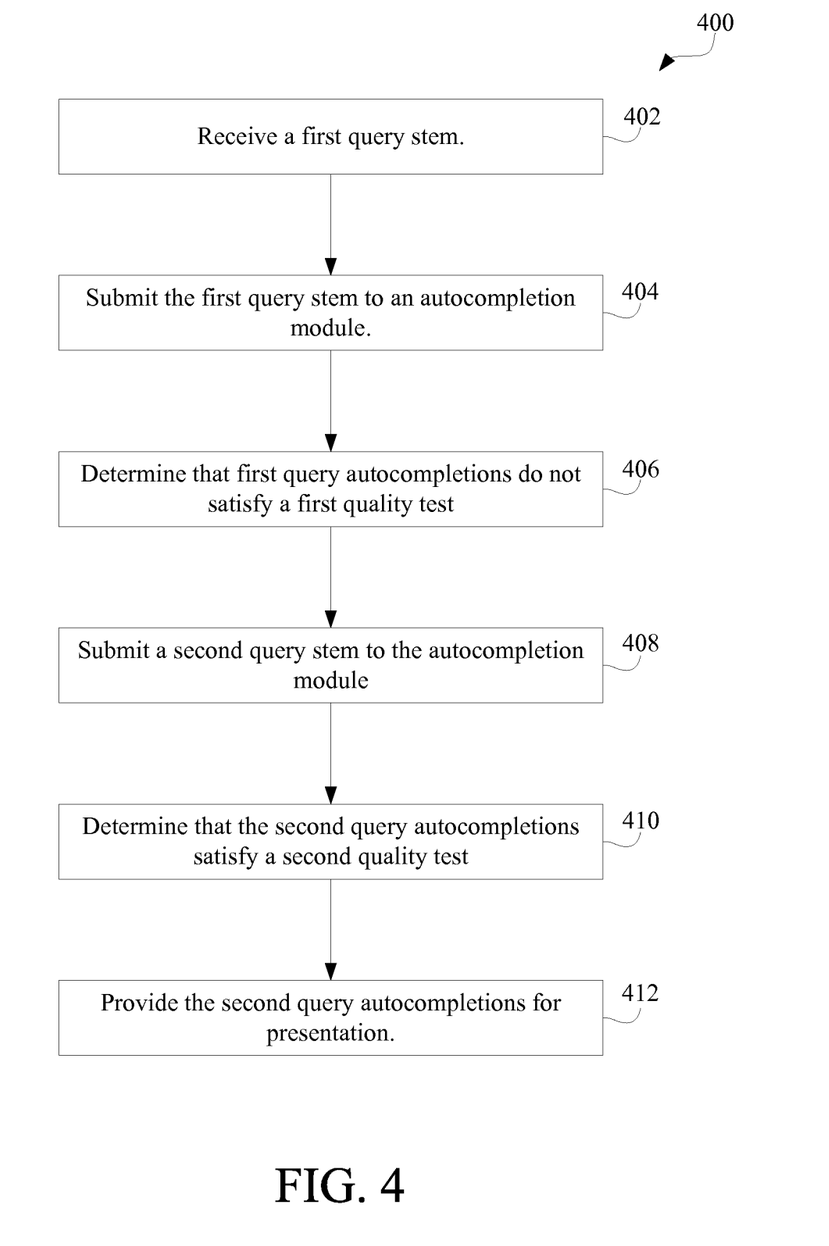
FIG. 4 illustrates an example process for determining query completions.

FIG. 4 illustrates a flowchart of an example process for determining query completions. For convenience, the operations will be described with reference to a system that performs the operations. The system can be, for example, the search engine system 114 described in reference to FIG. 1.

The process 400 receives a first query stem (402). The first query stem is received in a search engine query input field before the user interface receives an input submitting the first query stem as a query string to a search engine.

The process 400 submits the first query stem to an autocompletion module (404). The process 400 submits the first query stem to obtain query autocompletions.

The process 400 determines that the first query autocompletions do not include one or more autocompletions satisfying a first quality test (406). The first quality test can include, for example, a measure of the relative frequency of submission of prior queries that include a potential query completion to the frequency of submission of prior queries that include the first query stem.

The process 400 submits a second query stem to the autocompletion module (408). The second query stem is the first query stem with a prefix removed. The prefix is one or more initial query terms from the first query stem.

The process 400 determines that the second query autocompletions include one or more second autocompletions satisfying a second quality test (410).

The process 400 provides the second autocompletions for presentation (412) to a user interface. The second autocompletions can be formatted for display in a drop-down list or other form for selection by the user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. What is claimed is:

The invention claimed is:

1. A computer-implemented method comprising:
   receiving a query input in a search engine query input field in a user interface, before receiving an input expressly submitting the query input as a query to a search engine, the query input comprising multiple query terms;
   submitting the query input as a first query stem to an autocompletion module to obtain first query autocompletions;
   determining that the first query autocompletions do not satisfy a first quality test and, in response, submitting a second query stem to the autocompletion module to obtain second query autocompletions, the second query stem being the first query stem with a prefix removed;
   receiving, from the autocompletion module, one or more second query autocompletions satisfying a second quality test, wherein the second quality test includes determining a ratio of a number of times a potential autocompletion occurs in a corpus of user queries to a number of times any query that includes the second query stem occurs in the corpus user queries, and comparing the ratio to a threshold value; and
   providing the one or more second query autocompletions for presentation on the user interface.

2. The method of claim 1, wherein the second quality test further comprises applying a smoothing factor to the ratio.

3. The method of claim 1, further comprising:
   determining the prefix, wherein determining the prefix comprises:
      assigning a query term of the multiple query terms to the prefix;
      determining the query term is part of a compound word; and
      assigning a second part of the compound word to the prefix.

4. A system, comprising:
   one or more computers programmed to perform operations comprising:
      receiving a query input in a search engine query input field in a user interface, before receiving an input expressly submitting the query input as a query to a search engine, the query input comprising multiple query terms;
      submitting the query input as a first query stem to an autocompletion module to obtain first query autocompletions;
      determining that the first query autocompletions do not satisfy a first quality test, and, in response, submitting a second query stem to the autocompletion module to obtain second query autocompletions, the second query stem being the first query stem with a prefix removed;
      receiving, from the autocompletion module, one or more second query autocompletions satisfying a second quality test, wherein the second quality test includes determining a ratio of a number of times a potential autocompletion occurs in a corpus of user queries to a number of times any query that includes the second query stem occurs in the corpus user queries, and comparing the ratio to a threshold value; and providing one or more second query autocompletions for presentation on the user interface.

5. The system of claim 4, wherein the second quality test further comprises applying a smoothing factor to the ratio.

6. The system of claim 4, the operation further comprising:
determining the prefix, wherein determining the prefix comprises:
assigning a query term of the multiple query terms to the prefix;
determining the query term is part of a compound word; and
assigning a second part of the compound word to the prefix.

7. A non-transitory computer storage medium encoded with a computer program, the computer program comprising instructions that when executed by data processing apparatus cause the data processing apparatus to perform operations comprising:
receiving a query input in a search engine query input field in a user interface, before receiving an input expressly submitting the query input as a query to a search engine, the query input comprising multiple query terms;
submitting the query input as a first query stem to an autocompletion module to obtain first query autocompletions;
determining that the first query autocompletions do not satisfy a first quality test, and, in response, submitting a second query stem to the autocompletion module to obtain second query autocompletions, the second query stem being the first query stem with a prefix removed;
receiving, from the autocompletion module, one or more second query autocompletions satisfying a second quality test, wherein the second quality test includes determining a ratio of a number of times a potential autocompletion occurs in a corpus of user queries to a number of times any query that includes the second query stem occurs in the corpus user queries, and comparing the ratio to a threshold value; and providing the one or more second query autocompletions for presentation on the user interface.

8. The computer storage medium of claim 7, wherein the second quality test further comprises applying a smoothing factor to the ratio.

9. The computer storage medium of claim 7, the operations further comprising:
determining the prefix, wherein determining the prefix comprises:
assigning a query term of the multiple query terms to the prefix;
determining the query term is part of a compound word; and
assigning a second part of the compound word to the prefix.

10. A computer-implemented method comprising:
receiving a query input in a search engine query input field in a user interface, before receiving an input expressly submitting the query input as a query to a search engine, the query input comprising multiple query terms;
submitting the query input as a first query stem to an autocompletion module to obtain first query autocompletions;
determining that the first query autocompletions do not satisfy a first quality test, and, in response, submitting one or more shortened query stems to the autocompletion module to obtain shortened query autocompletions, each shortened query stem being the first query stem with one or more query terms removed;
receiving from the autocompletion module, one or more shortened query autocompletions satisfying a second quality test, wherein the second quality test includes determining a ratio of a number of times a potential autocompletion occurs in a corpus of user queries to a number of times any query that includes the shortened query stem occurs in the corpus user queries, and comparing the ratio to a threshold value;
collecting the shortened query autocompletions; and
providing the shortened query autocompletions for presentation on the user interface.

* * * * *